United States Patent Office.

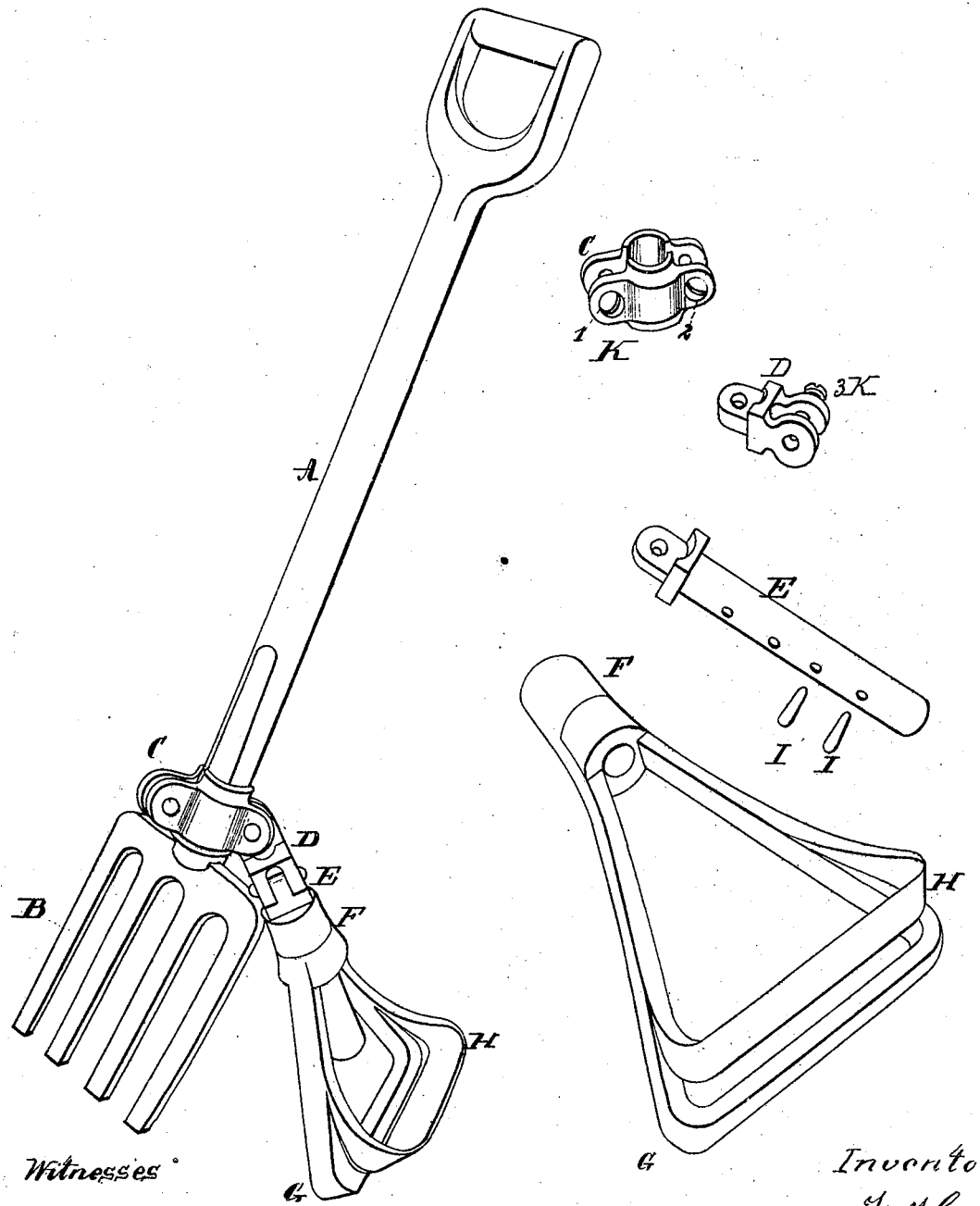

GEORGE W. HALL, OF TRIANGLE, NEW YORK.

Letters Patent No. 69,339, dated October 1, 1867.

IMPROVEMENT IN POTATO-DIGGER AND WEEDER.

*The Schedule referred to in these Letters Patent and making part of the same.*

TO ALL WHOM IT MAY CONCERN:

Be it known that I, GEORGE W. HALL, of Triangle, in the county of Broome, in the State of New York, have invented a new and useful improvement which I call the "Improved Potato-Digger and Garden-Weeder;" and I do hereby declare that the following is a full, clear, and exact description of the construction and operation of the same, reference being had to the annexed drawings, making a part of this specification.

It consists of a fulcrum attached to the handle of a garden-fork, shovel, spade, or any other implement which may be used by means of it, working upon the lever principle, one pound at the handle producing a result of three or more at the end of the fork or other implement, and will work in any direction, having the side motion, movement forward and backward, and also the rotary motion. The fulcurm may be lengthened or shortened to suit the convenience of the operator.

I construct my potato-digger and garden-weeder in the following manner, viz: I take an ordinary garden-fork, spade, or shovel and attach my improvement by a clamp, C, which can be fastened by means of screws, bolts, or rivets, readily and securely about any part of the handle A, and detached by loosening one of said screws, bolts, or rivets, thus saving the trouble of taking the fork from the handle to attach or detach the improvement. The section-joint D forms a part of two joints, working in opposite directions, the upper part with the lower rivet of the clamp allowing the forward and backward movement, the lower part helping to form the joint giving the fork or other implement the rolling motion. This section may be taken out at will, and the implement work as perfectly without it, with the exception of the rolling motion. It may be an advantage to leave out this joint in garden-weeding and work, that needs only a forward movement and stiffer handle. The swivel-spindle E is provided with holes at suitable distances apart, and besides helping to form the joint for allowing the rolling motion, permits the fork or other implement to be worked in any direction, and also, by the use of the pins I I, the fulcrum can be lengthened or shortened to correspond with the position of the clamp C upon the handle. The swivel-case F holds the spindle E to its place, and with it forms an elongated swivel-joint. This is an important feature of the improvement, as by it the implement can be worked at a leverage to suit the operator, and at the same time secures all the advantages of the swivel-joint. The fulcrum G is made in the open triangular form, to give it lightness, and to leave room for the operation of the swivel-spindle. The stirrup H on the side next to the operator, and for his foot to rest in, also gives the fulcrum a broader base and prevents it sinking into mellow ground. My attachment for the full size is made wholly of malleable iron, except the three small bolts and two pins, thus by its cheapness bringing it within the reach of every one desiring to use the improvement. It may, however, be made of any other suitable material.

Having described my improvement, what I claim as new, and desire to secure by Letters Patent, is—

1. A spade or spading-fork, having a pivoted fulcrum or rest provided with a swivel-joint, substantially as and for the purpose set forth.

2. A spade or spading-fork having a pivoted fulcrum or rest where the said fulcrum is adjustable on the handle of the spade or fork, and of adjustable length, substantially as described.

3. A spade or spading-fork constructed as described, viz, with an rdjustable pivoted swivelling fulcrum, as and for the purposes set forth.

GEORGE W. HALL.

Witnesses:
    J. M. JOHNSON,
    GEO. WHITNEY.